United States Patent [19]

Wickholm et al.

[11] Patent Number: 4,792,214

[45] Date of Patent: Dec. 20, 1988

[54] OPTICAL MAGNIFYING SYSTEM: 10 X LOUPE

[75] Inventors: David R. Wickholm; Donald J. Strittmatter, both of Tucson, Ariz.

[73] Assignee: Hughes Aircraft Company, Los Angeles, Calif.

[21] Appl. No.: 935,889

[22] Filed: Nov. 28, 1986

[51] Int. Cl.⁴ .................. G02B 25/00; G02B 11/18; G02B 11/26
[52] U.S. Cl. ............................................. 350/410
[58] Field of Search ................. 350/410, 465, 474

[56] References Cited

U.S. PATENT DOCUMENTS 3,390,935 7/1968 Scidmore ......................... 350/410
4,285,578 8/1981 Yamashita et al. ............... 350/410

Primary Examiner—John K. Corbin
Assistant Examiner—Rebecca D. Gass
Attorney, Agent, or Firm—M. W. Sales; R. A. Hays; A. W. Karambelas

[57] ABSTRACT

A six element optical magnifying system (10) is disclosed. The primary lens (12), secondary lens (14), tertiary lens (16), quaternary lens (18), quinary lens (20), and sextiary lens (22) form an optical system (10), having surfaces shaped to focus upon an object such that a high resolution image is formed at infinity at 10× magnification substantially over the entire field of view.

10 Claims, 1 Drawing Sheet

OPTICAL MAGNIFYING SYSTEM: 10 X LOUPE

BACKGROUND OF THE INVENTION

1. Field of the Invention

The present invention relates to a wide field of view optical magnifying system and more particularly to an eye loupe having a magnification power of 10 (10× magnification).

2. Description of Related Art

Visual inspection tools are used in several industrial field to inspect components for defects which cannot be seen with the naked eye. Many industries have stringent magnification specifications which must be met in order to be within desired specifications. In the soldering industry and especially in the aerospace circuit board industry, the solder connections must be inspected to meet desired specifications. Visual tools, such as magnifying eye loupes, are used to increase the apparent size of the viewed solder connection. This increase in size better enables an inspector to see and determine whether or not the solder connection meets desired specifications. Other applications will become apparent which utilize magnifying devices for inspection where inspection with the naked eye is inadequate.

Prior magnifying optical systems having 10× magnification exist in the field. These prior magnifiers generally have one to five lens elements and have several disadvantages. The prior eye loupes generally are not true 10× magnifiers and generally have a magnification power of less than what is specified on the magnifier. The magnifiers generally have a small field of view, which causes severe eye strain in just a short period of time. The viewing distance between the user's eye and the object is generally very short. This close viewing range causes the user to hold the viewed object in close proximity to his face and sometimes touching his nose. Generally, the prior eye loupe lenses have distorted imagery as the view traverses from the center to the periphery of the field of view. The prior lenses are somewhat heavy, have poor resolution, and have chromatic aberrations. Also, prior magnifiers generally limit the eye resolution along the axis of the magnifier. Thus, there is a need in the art to provide an optical magnifying system, having a wide field of view at a 10× magnification, which enables the operator to easily control the system during use.

SUMMARY OF THE INVENTION

Accordingly, it is an object of the present invention to overcome the disadvantages of the above art. The new and improved optical magnifying system of the present invention provides the art with an eye loupe which has high resolution over a large field of view. The invention includes lenses shaped to focus upon an object such that a high resolution image is formed at infinity at 10× magnification. Also, the present invention provides the art with a six element eye loupe which decreases distortion in the field of view, corrects chromatic aberrations, and provides true 10× magnification.

In one embodiment of the present invention, the lenses have the following shapes and surfaces. The primary lens is generally a negative planar-concave lens. The secondary and tertiary lenses are generally positive biconvex lenses. The quaternary lens is generally a negative concave-convex lens. The quinary lens is generally a positive convex-planar lens. The sextiary lens is generally a negative planar-concave lens.

Generally in the same embodiment, the primary and secondary lenses, the tertiary and quaternary lenses, and the quinary and sextiary lenses, are coupled together to form a first, second, and third doublet. The first and second doublets are positioned with respect to one another such that the positive lenses are adjacent to one another. The second and third doublets are positioned with respect to one another such that a negative lens is adjacent to a positive lens. A space is generally formed between the first and second doublet and the second and third doublet such that the distance between the doublets is predetermined. Generally, the first doublet is positioned such that the negative lens is at a predetermined working distance adjacent to the object being viewed and the negative lens of the third doublet is positioned at a predetermined distance adjacent to an aperture stop, such as the human eye.

From the subsequent description and the appended claims taken in conjunction with the accompanying drawings, other objects and advantages of the present invention will become apparent to one skilled in the art.

DESCRIPTION OF THE PREFERRED EMBODIMENT

Figure 1:
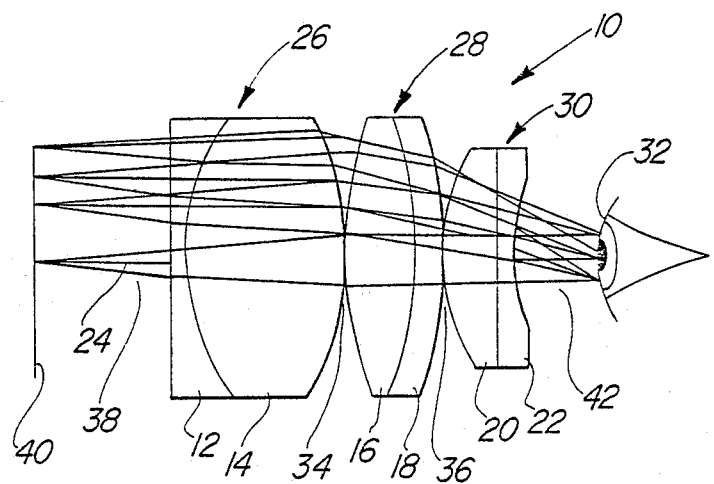
FIG. 1 is a schematic view of an optical magnifying system in accordance with the present invention.

Turning to FIG. 1, a six lens optical magnifying system is illustrated and designated with the reference numeral (10). The system (10) includes a primary lens (12), which is a negative lens, positioned adjacent to a secondary lens (14), which is a positive lens. The secondary lens (14) is positioned adjacent to the tertiary lens (16), which is a positive lens, which, in turn, is positioned adjacent to a quaternary lens (18), which is a negative lens. The quaternary lens (18) is positioned adjacent to a quinary lens (20), which is a positive lens, which, in turn, is positioned adjacent to a sextiary lens (22), which is a negative lens.

The primary lens (12) defines an optical axis (24), which runs through the vertex of the lens. Generally, the primary lens is a planar-concave lens formed from a high dispersion glass material. The primary lens (12) has a radius of curvature of infinity on the planar or front surface of the lens and a predetermined radius of curvature on the concave or back surface of the lens. Also, the primary lens (12) has a predetermined thickness at the vertex and predetermined aperture sizes on the planar front surface and the concave back surface.

The secondary lens (14) is centered with respect to the optical axis (24). Generally, the secondary lens (14) is a biconvex lens formed from a low dispersion glass material. Generally, the secondary lens (14) has a predetermined radius of curvature on the convex or front surface of the lens and a predetermined radius of curvature on the convex or back surface of the lens. The secondary lens (14) has a predetermined thickness at the vertex and predetermined aperture sizes on the convex front and convex back surfaces.

The tertiary lens (16) is centered with respect to the optical axis (24). Generally, the tertiary lens (16) is a biconvex lens formed from a low dispersion glass material. Generally, the tertiary lens (16) has a predetermined radius of curvature on the convex front and convex back surfaces of the lens. Generally, the tertiary lens (16) has a predetermined thickness at the vertex and predetermined aperture sizes on the convex front and convex back surfaces.

The quaternary lens (18) is centered with respect to the optical axis (24). Generally, the quaternary lens (18) is a concave-convex lens formed from a high dispersion glass material. Generally, the quaternary lens (18) has a predetermined radius of curvature on the concave or front surface and a predetermined radius of curvature on the convex or back surface. The quaternary lens (18) has a predetermined thickness at the vertex and predetermined aperture sizes on the concave front and convex back surfaces.

The quinary lens (20) is centered with respect to the optical axis (24). Generally, the quinary lens (20) is a convex-planar lens formed from a low dispersion glass material. Generally, the quinary lens (20) has a predetermined radius of curvature on the convex or front surface and radius o curvature of infinity on the planar or back surface. The quinary lens (20) has a predetermined thickness at the vertex and predetermined aperture sizes on the convex front and planar back surfaces.

The sextiary lens (22) is centered with respect to the optical axis (24). Generally, the sextiary lens (22) is a planar-concave lens formed from a high dispersion glass material. Generally, the sextiary lens (22) has a radius of curvature on the planar or front surface of infinity and a predetermined radius of curvature on the concave back surface. The sextiary lens (22) has a predetermined thickness at the vertex and predetermined aperture sizes on the planar front and concave back surfaces.

Generally, the primary and secondary lenses (12) and (14), the tertiary and quaternary lenses (16) and (18), and quinary and sextiary lenses (20) and (22) are adhered together, by conventional means, to form a first (26), second (28), and third (30) doublet. The first and second doublets (26) and (28) are orientated such that the positive secondary and tertiary lenses (14) and (16) are positioned adjacent to one another in the optical system (10). The second and third doublets (28) and (30) are orientated such that the negative quaternary lens (18) is positioned adjacent to the positive quinary lens (20) in the optical system (10). The negative primary and sextiary lenses (12) and (22) are positioned such that the primary lens (12) is at a predetermined distance adjacent to the object (40) being viewed and the sextiary lens (22) is positioned at a predetermined distance adjacent to an aperture stop (32). The aperture stop (32) may be an electronic sensor or the like, however, normally the aperture stop (32) is the human eye.

Very short spaces (34) and (36) are formed between the first (26) and second (28) and third (30) doublets. The spaces (34) and (36) have a predetermined length measurement between the doublets (26) and (28) and (28) and (30), respectively. The size of the spaces (34) and (36) along with the curvatures, thicknesses, and glass types of the lenses (12), (14), (16), (18), (20), and (22) enable the system (10) to perform as a true 10× magnifier.

The effective focal length of system (10) is of a predetermined length. Generally, magnification power is determined by dividing the effective focal length (in inches) into 10 inches. In the present invention, the working distance (38), which is a predetermined distance between the object (40) and the primary lens (12), is approximately 60% of the effective focal length of the system (10). Generally, the distance (42) from the aperture stop (32), or the user's eye, to the sextiary lens (22) is of a predetermined distance of approximately 40% of the effective focal length of the system (10). These two distances, (38) and (42), along with the lens thicknesses and separations enable the system (10) to achieve a total object to eye distance greater than 2.4 times tee effective focal length of the system. The lens glasses enhance correction of axial and lateral chromatic aberrations. The lens radii minimize spherical aberration, coma, and astigmatism over the large diameter object field of view. The present invention displays high resolution from the center of the field of view out to the edge of the full one inch diameter object field of view. The resolution of the system is limited only by the resolution of the user's eye. Thus, when electronic sensors are used with the present system similiar high resolution over the field of view will result.

A specific prescription for a 10× eye loupe having a six element configuration and high resolution over a wide field of view is given in the following table:

TABLE 1

Optical Prescription

| Element Number | | Glass Type | Radius of Curvature Front/Back | Thickness | Aperture Diameter Front/Back |
|---|---|---|---|---|---|
| (40) | Working Distance | | | 0.5998 | |
| (12) | Primary Lens | SF15 | INF/+0.9673 | 0.0700 | 1.1200/1.1200 |
| (14) | Secondary Lens | SK14 | +0.9673/ −1.3019 | 1.1200- /1.1200 | |
| (34) | Space | | | 0.0050 | |
| (16) | Tertiary Lens | SK14 | +1.6968/ −1.6968 | 0.3100 | 1.1200/1.1200 |
| (18) | Quaternary Lens | SF15 | −1.6968/ −2.1869 | 0.1200 | 1.1200/1.200 |
| (36) | Space | | | 0.0050 | |
| (20) | Quinary Lens | SK14 | +0.9673/INF | 0.2200 | 0.8600/0.8600 |
| (22) | Sextiary Lens | SF15 | INF/+0.8044 | 0.0700 | 0.8600/0.7000 |
| (42) | Aperture Stop Distance | | | 0.4000 | |
| (32) | Aperture Stop | | | 0.2000 | |

Image Distance = Infinity

Figure 2:
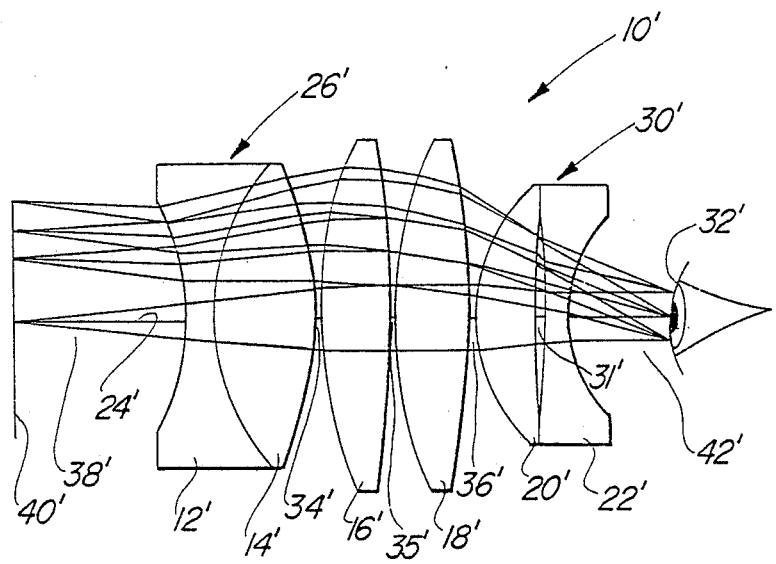
FIG. 2 is a schematic view of a second embodiment of an optical magnifying system in accordance with the present invention.

Note - Positive radius indicates the center of curvature is to the right.
Negative radius indicates the center of curvature is to the left.
Dimensions are given in inches.
Thickness is axial distance to next surface.
Reference Wavelength = 589.0 NM
Spectral Region = 486.0–656.0 NM FIG. 2 illustrates a second embodiment of the present invention. Similar elements as in FIG. 1 are designated with the same reference numerals, except in FIG. 2 such numerals have been primed.

Turning to FIG. 2, a six lens optical magnifying system is illustrated and designated with the reference numeral (10'). The system (10') includes a primary lens (12'), which is a negative lens, positioned adjacent to a secondary lens (14'), which is a positive lens. The secondary lens((14') is positioned adjacent to a tertiary lens (16'), which is a positive lens, which, in turn, is positioned adjacent to a quaternary lens (18'), which is a positive lens. The quaternary lens (18') is positioned adjacent to a quinary lens (20'), which is a positive lens, which, in turn, is positioned adjacent to a sextiary lens (22'), which is a negative lens.

The primary lens (12') defines an optical axis (24'), which runs through the vertex of the lens. Generally, the primary lens is a biconcave lens formed from a high dispersion glass material. The primary lens (12') has a predetermined radius of curvature on the concave or front surface of the lens and a predetermined radius of curvature on the concave or back surface of the lens. Also, the primary lens (12') has a predetermined thickness at the vertex and predetermined aperture sizes on the concave front and concave back surfaces.

The secondary lens (14') is centered with respect to the optical axis (24'). Generally, the secondary lens (14') is a biconvex lens formed from a low dispersion glass material. Generally, the secondary lens (14') has a predetermined radius of curvature on the convex front and convex back surfaces of the lens. The secondary lens (14') has a predetermined thickness at the vertex and predetermined aperture sizes on the convex front and convex back surfaces.

The tertiary lens (16') is centered with respect to the optical axis (24'). Generally, the tertiary lens (16') is a biconvex lens formed from a moderately low dispersion glass material. Generally, the tertiary lens (16') has a predetermined radius of curvature on the convex front and convex back surfaces of the lens. Generally, the tertiary lens (16') has a predetermined thickness at the vertex and predetermined aperture sizes on the convex front and convex back surfaces.

The quaternary lens (18') is centered with respect to the optical axis (24'). Generally, the quaternary lens (18') is a biconvex lens formed from a moderately low dispersion glass material. Generally the quaternary lens (18') has a predetermined radius of curvature on the convex front and convex back surfaces of the lens. Generally, the quaternary lens (18') has a predetermined thickness at the vertex and predetermined aperture sizes on the convex front and convex back surfaces.

The quinary lens((20') is centered with respect to the optical axis (24'). Generally, the quinary lens (20') is a convex-concave lens formed from a low dispersion glass material. Generally, the quinary lens (20') has a predetermined radius of curvature on the convex front surface and the concave back surface. The quinary lens (20') has a predetermined thickness at the vertex and predetermined aperture sizes on the convex front and concave back surfaces.

The sextiary lens (22') is centered with respect to the optical axis (24'). Generally, the sextiary lens (24') is a biconcave lens formed from a high dispersion glass material. Generally, the sextiary lens (22') has a predetermined radius of curvature on the concave or front surface of the lens and a predetermined radius of curvature on the concave or back surface of the lens. The sextiary lens (22') has a predetermined thickness at the vertex and predetermined aperture sizes on the concave front and concave back surfaces.

Generally, the primary and secondary lenses (12') and (14') and the quinary and sextiary lenses (20') and (22') are coupled forming a first (26') and second (30') doublet. The first doublet (26') is coupled by conventional means, such as adhesives. The second doublet (30') is coupled to form an air doublet. The space (31') between the quinary and sextiary lenses (20') and (22') has a predetermined length measurement. The first and second doublets (26') and (30') are orientated such that the positive secondary and tertiary lenses (14') and (16') and the positive quaternary and quinary lenses (18') and (20') are positioned adjacent to one another in the optical system (10'). The negative primary and sextiary lenses (12') and (22') are positioned such that the primary lens (12') is adjacent to the object (40') being viewed and the sextiary lens (22') is positioned adjacent to an aperture stop (32'). The aperture stop (32') may be an electronic sensor or the like, however, normally the aperture stop (32') is the human eye.

Spaces (34'), (35') and (36') are formed between the first (26') doublet and the tertiary lens (16'), between the tertiary lens (16') and the quaternary lens (18') and between the quaternary lens (18') and the secondary doublet (30'). The spaces (34'), (35') and (36') have a predetermined length. The length of the spaces (34'), (35'), and (36') along with the curvature, thicknesses, and glass types of the lenses (12'), (14'), (16'), (18'), (20') and (22') enable the system to perform as a true 10× magnifier.

The effective focal length of system (10') is of a predetermined length. Generally, magnification power is determined by dividing the effective focal length (in inches) into 10 inches. In the present invention, the working distance (38'), which is a predetermined distance between the object (40') and the primary lens (12'), is approximately 75% of the effective focal length of the system (10'). Generally, the distance (42'), which is a predetermined distance from the sextiary lens (22') to the aperture stop (32'), is approximately 45% of the effective focal length of the system (10'). These two distances (38') and (42') along with the lens thicknesses, enable the system (10') to achieve a total object to eye distance greater than 2.8 times the effective focal length of the system. The lens glasses enhance correction of axial and lateral chromatic aberrations. The lens radii minimize spherical aberrations, coma and field curvature as well as providing a flat sagital field and maintaining low distortion over the large diameter object field of view. The present invention displays high resolution from the center of the field of view out to the edge of the full one inch diameter object field of view. The resolution of the system is limited only by the resolution of the user's eye. Thus, when electronic sensors are used with the present system, similiar high resolution over the field of view will result.

A specific prescription for a 10× eye loupe having a six element configuration and a wide field of view is given in the following table:

TABLE 2

| | Optical Prescription | | | |
|---|---|---|---|---|
| Element Number | Glass Type | Radius of Curvature Front/Back | Thickness | Aperture Diameter Front/Back |
| (40') Working Distance | | | 0.7500 | |
| (12') Primary Lens | SF56 | −0.9500/ +0.9500 | 0.1000 | 0.8522/1.2000 |
| (14') Secondary Lens | LAK10 | +0.9500/ −1.5248 | 0.4500 | 1.2000/1.2000 |
| (34') Space | | | 0.0200 | |
| (16') Tertiary Lens | BASF10 | +1.7917/ −5.3060 | 0.3000 | 1.4000/1.4000 |
| (35') Space | | | 0.0200 | |
| (18') Quaternary Lens | BASF10 | +1.7917/ −3.6033 | 0.3300 | 1.4000/1.4000 |
| (36') Space | | | 0.0200 | |
| (20') Quinary Lens | LAK10 | +0.7664/ +4.7920 | 0.2600 | 1.0200/1.0200 |
| (31') Space | | | 0.0500 | |
| (22') Sextiary | SF56 | −4.7920/ | 0.1000 | 1.0200/0.8000 |

TABLE 2-continued

| | | Optical Prescription | | |
|---|---|---|---|---|
| Element Number | Glass Type | Radius of Curvature Front/Back | Thickness | Aperture Diameter Front/Back |
| (42') Lens Aperture Stop Distance | | +0.600 | 0.4500 | |
| (32') Aperture Stop | | | 0.2000 | |
| Image Distance = Infinity | | | | |

Note - Positive radius indicates the center of curvature is to the right.
Negative radius indicates the center of curvature is to the left.
Dimensions are given in inches.
Thickness is axial distance to next surface.
Reference Wavelength = 589.0 NM
Spectral Region = 486.0–656.0 NM Advantages provided by the system which are examples of the preferred embodiment of this invention include the lightweight, compact size and true 10× magnification of the optical system. The field of view is enlarged over that of existing eye loupes while high resolution is maintained over the field of view. Also, the relatively long distances between the viewer and the object and the object and the magnifier afford more comfort and convenience to the viewer.

Specific utility with the six element eye loupe of this invention includes the inspection of solder connections in varying industries. Particularly, the inspection of solder connections on circuit boards and the like where naked eye visualization cannot detect the imperfections in the solder connections.

While it will be apparent that the preferred embodiment is well calculated to fill the above stated objects, it will also be appreciated that the present invention is susceptible to modification, variation, alteration, and change without varying from the proper scope and fair meaning of the subjoined claims.

What is claimed is:

1. An optical magnifying system comprising:
   a primary lens (12), said primary lens (12) being a negative planar-concave lens disposed a predetermined working distance from an object being viewed and defining an optical axis (24);
   a secondary lens (14), said secondary lens (14) being a positive biconvex lens disposed adjacent said primary lens (12) and centered with respect to said optical axis (24);
   a tertiary lens (16), said tertiary lens (16) being positive biconvex lens disposed adjacent said secondary lens (14) such that said secondary lens (14) is disposed between said tertiary lens (16) and said primary lens (12) and centered with respect to said optical axis (24);
   a quaternary lens (18), said quaternary lens (18) being a negative concave-convex lens disposed adjacent said tertiary lens (16) such that said tertiary lens (16) is disposed between said quaternary lens (18) and said secondary lens (14) and centered with respect to said optical axis (24);
   a quinary lens (20), said quinary lens (20) being a positive convex-planar lens disposed adjacent said quaternary lens (18) such that said quaternary lens (18) is disposed between said quinary lens (20) and said tertiary lens (16) and centered with respect to said optical axis (24); and
   a sextiary lens (22), said sextiary lens (22) being a negative planar-concave lens disposed adjacent said quinary lens (20) such that said quinary less (20) is disposed between said sextiary lens (22) and said quaternary lens (18) and centered with respect to said optical axis (24), said primary (12), secondary (14), tertiary (16), quaternary (18), quinary (20) and sextiary (22), lenses having surfaces shaped to focus upon said object such that an image is formed at infinity at 10 power magnification.

2. The optical system of claim 1, wherein said system forms a high resolution image substantially over the entire field of view of the system.

3. The optical system of claim 1 wherein said system is circular in shape and adapted to be hand-held.

4. The optical system of claim 1 wherein said working distance is at least 60% of the focal length of the system.

5. The optical system according to claim 1 wherein said primary (12) and secondary (14) lenses form a first (26) doublet,
   said tertiary (16) and quaternary (18) lenses form a second (28) doublet,
   and said quinary (20) and sextiary (22) lenses form a third (30) doublet.

6. The optical system according to claim 5 wherein said first and second doublets (26) and (28) are positioned such that said positive lenses are positioned adjacent to one another and wherein said second (28) and third (30) doublets are positioned such that said negative lens of said second doublet (28) is positioned adjacent to said positive lens of said third (30) doublet.

7. The optical system according to claim 6 wherein a space (34) of a predetermined distance is formed between said positive lenses, of said first and second doublets and
   a space (36) of a predetermined distance is formed between said negative and positive lenses of said second and third doublets.

8. The optical system according to claim 1 wherein said system conforms substantially to the following table in which all elements have the characteristic values shown and, proceeding from the object to the eye of the viewer:

| Element Number | Glass Type | Radius of Curvature Front/Back | Thickness | Aperture Diameter Front/Back |
|---|---|---|---|---|
| (40) Working Distance | | | 0.5998 | |
| (12) Primary Lens | SF15 | INF/+0.9673 | 0.0700 | 1.1200/1.1200 |
| (14) Secondary Lens | SK14 | +0.9673/−1.3019 | 0.7000 | 1.1200/1.1200 |
| (34) Space | | | 0.0050 | |
| (16) Tertiary Lens | SK14 | +1.6968/−1.6968 | 0.3100 | 1.1200/1.1200 |
| (18) Quaternary Lens | SF15 | −1.6968/−2.1869 | 0.1200 | 1.1200/1.1200 |
| (36) Space | | | 0.0050 | |
| (20) Quinary Lens | SK14 | +0.9673/INF | 0.2200 | 0.8600/0.8600 |
| (22) Sextiary Lens | SF15 | INF/+0.8044 | 0.0700 | 0.8600/0.7000 |
| (42) Aperture Stop Distance | | | 0.4000 | |
| (32) Aperture/Stop eye | | | 0.2000 | |

-continued

| Element Number | Glass Type | Radius of Curvature Front/Back | Thickness | Aperture Diameter Front/Back |
|---|---|---|---|---|
| Image Distance = Infinity | | | | |

Note - Positive radius indicates the center of curvature is to the right.
Negative radius indicates the center of curvature is to the left.
Dimensions are given in inches.
Thickness is axial distance to next surface.
Reference Wavelength = 589.0 NM
Spectral Region = 486.0–656.0 NM 9. An optical magnifying system comprising:
a primary lens (12'), said primary lens (12') being a negative biconcave lens disposed a predetermined working distance from an object being viewed and defining an optical axis (24');
a secondary lens (14'), said secondary lens (14') being a positive biconvex lens disposed adjacent said primary lens (12') and centered with respect to said optical axis (24');
a tertiary lens (16'), said tertiary lens (16') being a positive biconvex lens disposed adjacent said secondary lens (14') such that said secondary lens (14') is disposed between said tertiary lens (16') and said primary lens (12') and centered with respect to said optical axis (24');
a quaternary lens (18'), said quaternary lens (18') being a positive biconvex lens disposed adjacent said tertiary lens (16') such that said tertiary lens (16') is disposed between said quaternary lens (18') and said secondary lens (14') and centered with respect to said optical axis (24');
a quinary lens (20'), said quinary lens (20') being a positive convex-concave lens disposed adjacent said quaternary lens (18') such that said quaternary lens (18') is disposed between said quinary lens (20') and said tertiary lens (16') and centered with respect to said optical axis (24'); and
a sextiary lens (22'), said sextiary lens (22') being a negative biconcave lens disposed adjacent said quinary lens (20') such that said quinary lens (20') is disposed between said sextiary lens (22') and said quaternary lens (18') and centered with respect to said optical axis (24'), said primary (10'), secondary (14'), tertiary (16'), quaternary (18'), quinary (20') and sextiary (22') lenses having surfaces shaped to focus upon said object such that an image is formed at infinity at 10 power magnification.

10. The optical system according to claim 9 wherein said system conforms substantially to the following table in which all elements have the characteristic values shown and, proceeding from the object to the eye of the viewer:

| Element Number | | Glass Type | Radius of Curvature Front/Back | Thickness | Aperture Diameter Front/Back |
|---|---|---|---|---|---|
| (40') | Working Distance | | | 0.7500 | |
| (12') | Primary Lens | SF56 | −0.9500/ +0.9500 | 0.1000 | 0.8522/1.2000 |
| (14') | Secondary Lens | LAK10 | +0.9500/ −1.5248 | 0.4500 | 1.2000/1.2000 |
| (34') | Space | | | 0.0200 | |
| (16') | Tertiary Lens | BASF10 | +1.7917/ −5.3060 | 0.3000 | 1.4000/1.4000 |
| (35') | Space | | | 0.0200 | |
| (18') | Quaternary Lens | BASF10 | +1.7917/ −3.6033 | 0.3300 | 1.4000/1.4000 |
| (36') | Space | | | 0.0200 | |
| (20') | Quinary Lens | LAK10 | +0.7664/ +4.7920 | 0.2600 | 1.0200/1.0200 |
| (31') | Space | | | 0.0500 | |
| (22') | Sextiary Lens | SF56 | −4.7920/ +0.6000 | 0.1000 | 1.0200/0.8000 |
| (42') | Aperture Stop Distance | | | 0.4500 | |
| (32') | Aperture Stop/ eye | | | | 0.2000 |

Image Distance = Infinity

Note - Positive radius indicates the center of curvature is to the right.
Negative radius indicates the center of curvature is to the left.
Dimensions are given in inches.
Thickness is axial distance to next surface.
Reference Wavelength = 589.0 NM
Spectral Region = 486.0–656.0 NM

* * * * *